UNITED STATES PATENT OFFICE.

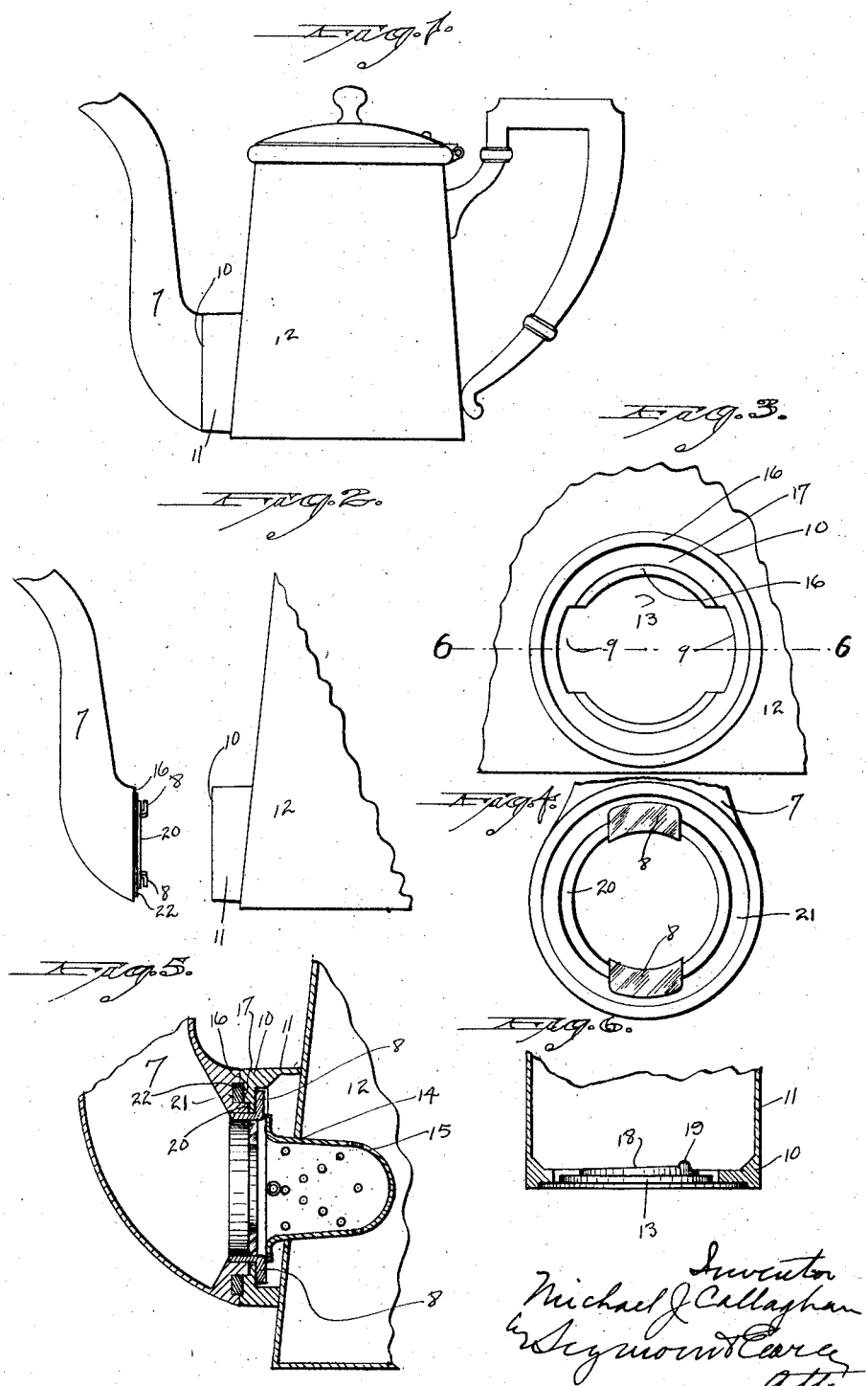

MICHAEL J. CALLAGHAN, OF NEW HAVEN, CONNECTICUT.

DEMOUNTABLE-SPOUT COOKING UTENSIL.

1,361,441.  Specification of Letters Patent.  Patented Dec. 7, 1920.

Application filed August 2, 1920. Serial No. 400,809.

*To all whom it may concern:*

Be it known that I, MICHAEL J. CALLAGHAN, a citizen of the United States, residing at New Haven, in the county of New Haven and State of Connecticut, have invented a new and useful Improvement in Demountable-Spout Cooking Utensils; and I do hereby declare the following, when taken in connection with the accompanying drawings and the characters of reference marked thereon, to be a full, clear, and exact description of the same, and which said drawings constitute part of this application, and represent, in—

Figure 1, a view in side elevation of a coffee-pot embodying my invention.

Fig. 2, a detail view in side elevation of the spout shown as removed from the body of the pot which is broken away except as to its lower front corner which mounts the spout-base.

Fig. 3, a detached broken view in front elevation showing the mounting-ring upon the body of the pot with the strainer removed.

Fig. 4, a view in inside elevation of the butt of the spout.

Fig. 5, a broken view of the pot in vertical central section, showing the spout as applied to the pot and the strainer in place therein.

Fig. 6, a view in transverse section on line 6—6 of Fig. 3, looking downward and showing one of the spout-cams and the spout-stop thereof.

My invention relates to an improved demountable-spout for coffee-pots and kindred cooking utensils, the object being to provide a convenient and efficient pot from which the spout may be easily demounted for the removal and cleaning of the strainer and then as readily replaced after which the pot presents the appearance of an ordinary coffee-pot, or other utensils as the case may be.

With these ends in view my invention consists in a demountable-spout coffee-pot or similar utensil, having certain details of construction and combination of parts as will be hereinafter described and pointed out in the claims.

In carrying out my invention as herein shown, the demountable spout 7 is provided in the vertical plane at its lower or butt end with two oppositely located, oppositely extending, offsetting segmental locking tongues 8 adapted in size and form to pass through two oppositely located, segmental clearance-slots 9 arranged in the horizontal plane and formed in an annular mounting-ring 10 located in the outer end of a circular spout-base 11 secured to and offsetting at a right-angle from the lower front corner of the body 12 of the pot. The said ring 10 has a central opening 13 from which the said slots 9 lead outwardly as shown in Fig. 3. An opening 14 in the body of the pot registers with the opening 13 and permits the coffee to flow from the pot into the spout-base 11 and thence into the spout 7. The opening 14 foresaid receives a removable strainer 15 which may be of any approved construction and which is readily accessible for being removed for being cleaned after the spout has been demounted from the spout-base and re-inserted before the spout is re-applied thereto.

The slots 9 separate segmental bearing shoulders 16 located one above the other in the vertical plane and recessed below an annular packing shoulder 17 which in turn is recessed below the face of the edge of the ring as shown in Fig. 5. The inner faces of the shoulders 16 are shaped to form spout-cams 18 each terminating at one end in a spout-stop 19 as shown in Fig. 6.

The lower or butt end of the spout 7 is formed with an annular centering shoulder 20 from which the locking-tongues 8 offset and which engages with the recessed segmental shoulders 16 for centering the spout and provides means upon which it turns in being applied to and removed from the spout-base 11.

The centering shoulder 20 aforesaid is encircled by an annular groove 21 receiving a packing-washer 22 adapted in thickness to rest upon the annular packing-shoulder 17 of the spout-base, as also shown in Fig. 5.

To apply the spout 7, it is turned into the horizontal plane, whereby its tongues 8 are alined with the clearance slots 9 in the mounting-ring 10 of the spout base 11. The tongues 8 having been passed through the slots 9, the spout is rotated a quarter turn for bringing it into vertical plane, whereby the tongues 8 are caused to ride over the cams 18 with the effect of putting such pressure upon the washer 22 as to effectively seal the joint between the spout and the spout-base, the spout being prevented from being turned beyond the vertical by the engagement of the forward edges of the tongues 8 with the spout-stops 19. The spout having been thus applied to the coffee-pot or other utensil the same is used as though the spout were integral with the body. To demount the spout, it is only necessary to rotate it a quarter turn from right to left, whereby the tongues 8 are brought into line with the slots 9 after which the spout is drawn away from the spout base through which the strainer can now be readily moved, cleaned and replaced.

By thus providing for the ready removal of the spout and strainer it is possible to thoroughly clean the same every time the coffee pot or other utensil is used.

I claim:

A demountable-spout cooking utensil having a body, a spout-base applied thereto over an opening therein, a strainer removably located in the said opening, a mounting-ring located in the vertical plane in the outer end of the said spout-base and formed with clearance-slots and with segmental bearing-shoulders formed upon their inner faces with spout-cams, a removable spout provided with oppositely extending, oppositely located locking-tongues adapted to pass through the said slots and to co-act with the said cams when the spout is applied to the spout-base and turned a quarter turn, and a packing washer interposed between the lower end of the spout and the said ring and compressed by the action of the said tongues and cams.

In testimony whereof, I have signed this specification in the presence of two subscribing witnesses.

MICHAEL J. CALLAGHAN.

Witnesses:
MICHAEL I. GUTHRIE,
HERBERT F. FRYE.